INVENTOR:
HOWARD E. WILTSEY
BY: Emerson B Donnell
ATTORNEY

INVENTOR:
HOWARD E. WILTSEY
BY: Emerson B Donnell
ATTORNEY

United States Patent Office 2,803,325  
Patented Aug. 20, 1957

2,803,325

OVER-RUNNING AND TORQUE LIMITING CLUTCH

Howard E. Wiltsey, Racine, Wis., assignor to J. I. Case Company, Racine, Wis., a corporation of Wisconsin Application November 1, 1954, Serial No. 466,036

4 Claims. (Cl. 192—46)

This invention relates to a rotating power transmitting clutch, and, more specifically, it relates to a combination over-running and torque limiter clutch.

A particularly useful application of the combination clutch of this invention is found in the example of powering farm implements by a tractor. In this example there are high inertia loads where, for instance, a rotating forage cutter wheel is driven by the tractor. With the implement possessing high inertia, abrupt starting of the rotation of the implement's working parts creates an undesirable reactive impact in the tractor. Conversely, if the tractor implement driving power is stopped abruptly, the high inertia, created by the implement operating parts, undesirably tends to operate the driving device. Neither of these two conditions is desirable and both have been known to do damage to the tractor and the implement.

It is, therefore, an object of this invention to provide a clutch which can be employed between a driving member and a driven member of a large inertia factor to permit the transmission of only a certain capacity of torque between said driving member and said driven member and additionally to prevent the inertia of said driven member from being transmitted back to said driving member.

Another object is to provide a clutch which will perform the above object and which can also be readily and conveniently altered to change the torque limit, as desired.

Still another object is to provide a clutch which will automatically disengage, when a predetermined torque is transmitted, but which, nevertheless, will remain in alignment.

A further object is to provide a shear pin type of torque limiter clutch which need not be disassembled when a pin is sheared.

Other objects and advantages will become apparent upon reading the following description in conjunction with the accompanying drawings, wherein, Fig. 1 is a axial end view of a clutch containing a preferred form of this invention.

Similar reference numerals refer to similar parts throughout the three views.

Figure 1:
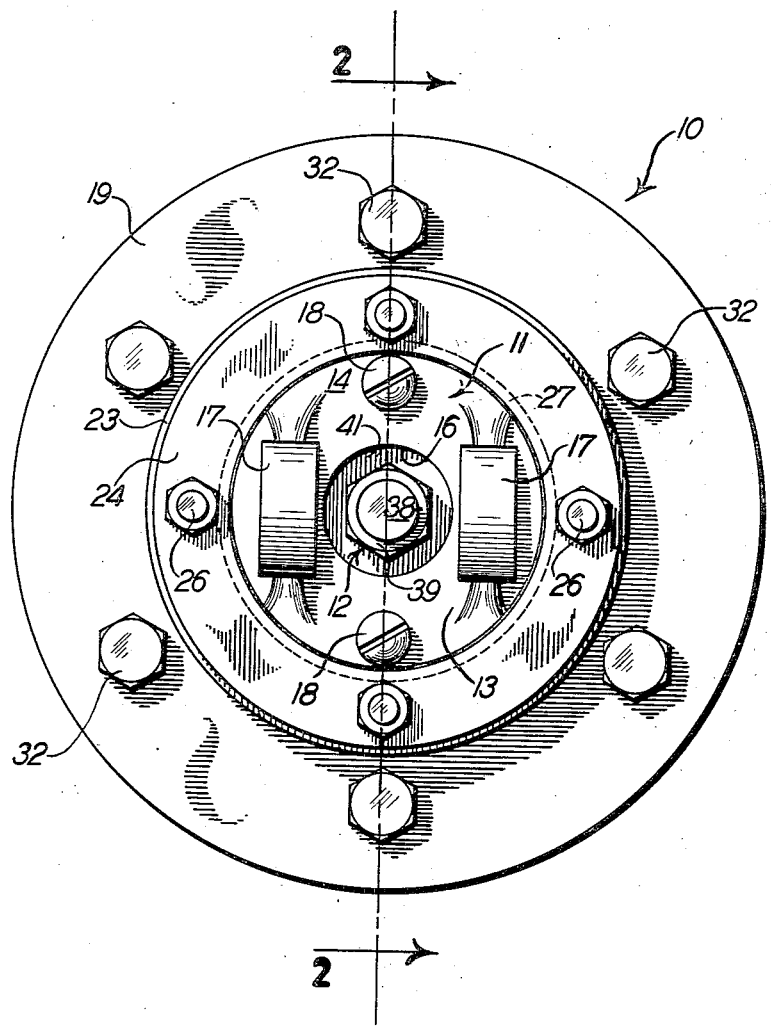
Figure 2:
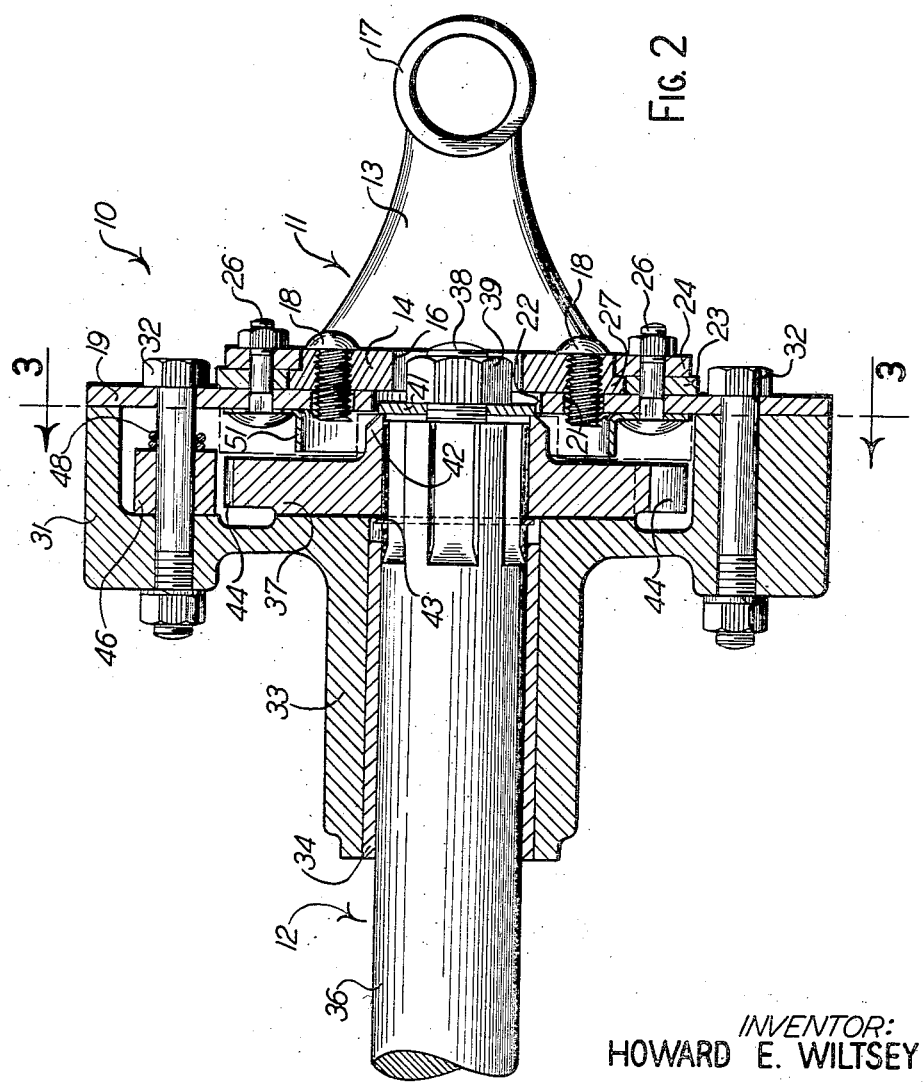
Fig. 2 is a sectional view taken on the line 2—2 of Fig. 1.

Figs. 1 and 2 show a clutch 10 attached intermediate a driving member 11 and a driven member 12. The driving member, which is only partly shown, is a conventional universal joint connector 13 with an integral circular flanged end 14. A central hole 16 is provided in the end 14 to receive a part of the driven member 12, as shown. Also, the connector 13 is provided with the usual rings 17 to attach to the unshown half of the universal joint. It should be further understood that the universal joint transmits rotary power from a prime mover, such as a farm implement tractor, to the driven member 12 through the clutch 10, as hereinafter described.

A pair of threaded shear pins or bolts 18 are screwed into threaded holes in the flange 14 to project beyond the face of the flange, as shown in Fig. 2. The rotary drive of the member 11 is transmitted through the bolts 18 to a flat circular cover plate 19 which has openings 21 for loosely receivably engaging the bolts 18. The plate 19 is also provided with a central opening 22 through which a part of the driven member extends. Retaining members consisting of a washer 23 and a washer 24 are concentrically positioned on one face of the plate 19 to be secured thereto by a plurality of bolts 26 which pass through aligned bolt holes in the three pieces. The internal diameter of the washer 24 is less than that of the washer 23 to retain a circular rim 27 of the flange 14 between the washer 24 and the plate 19 in a rotatable relation thereto. With this arrangement, the connector 13 can not be moved away from the clutch 10, and the assembly is sturdy but simple and inexpensive.

Figure 3:
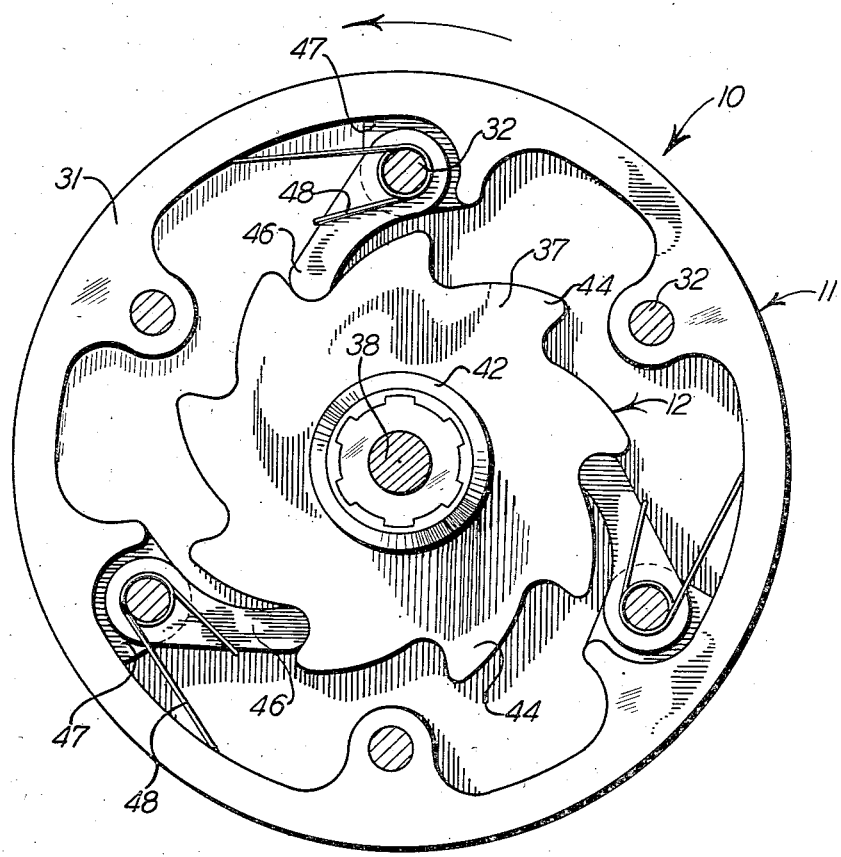
Fig. 3 is a sectional view taken on the line 3—3 of Fig. 2.

The outer diameter of the plate 19 is attached to a circular housing 31, to be rotatable therewith, by a plurality of bolts 32, as shown. The housing 31 contains an integral hub portion 33 which receives a bushing 34 to provide a bearing to rotatably support a driven shaft 36 journaled in the bearing. The end of the shaft 36 is splined, as shown, to be non-rotatable with respect to a ratchet wheel 37 which is similarly splined to mate with the splined shaft 36 in a usual manner. The extreme end of the shaft 36 is threaded in a reduced portion 38 to engage a lock nut 39 and to receive a washer 41. Nut 39 screws against the washer 41 to bear axially on a hub 42 of the ratchet wheel 47 and secure the latter on the shaft 36. Also, a snap ring 43 is positioned on the shaft 36 at the other end of the wheel hub 42 to properly position the wheel on the shaft. As best shown in Fig. 3, the periphery of the wheel 37 contains a plurality of teeth 44 spaced about the circumference of the wheel. The teeth are faced or inclined in a certain direction with relation to the direction of rotation of the driving and driven members as shown by the arrow above the drawing.

Also shown in Fig. 3 is a plurality of pawls 46 rotatably mounted on selected ones of the bolts 32 to extend transverse thereto. The housing 31 is suitably formed with recessed portions 47 to freely receive the pawls, as shown. Each pawl 46 is provided with a spring 48 which yieldingly urges it into driving engagement with the ratchet wheel 37, as the springs position the pawls substantially tangentially of the tooth base circle and inclined in the direction of rotation. The springs 48 are preferably coiled about the bolts 32 with one end of each spring engaging the inner wall of the housing 31 and the opposite end engaging the back of its respective pawl.

With the foregoing described arrangement, rotation of the driving member 11, in the direction mentioned, will be transmitted through the shear bolts 18 to the plate 19 and then to the housing 31 and the pawls 46 through the bolts 32. Then the driven member 12 is rotated by the pawls engaging the ratchet wheel 37 and the shaft 36, as shown in Fig. 3. When the driving member 11 is no longer powered, the momentum of the driven member, which includes massive parts (not shown), will cause the driven member to continue to rotate. The rotation is then free of the driving member as the ratchet wheel 37 slips past the pawls 46 which are forced by the teeth 44 toward the outside of the housing 31. Also, if the load on the driving member is beyond a predetermined amount, the bolts 18 will be sheared to permit the connector 13 to rotate with respect to the plate 19 and the other parts.

To restore the clutch to service the head ends of the sheared bolts 18 are screwed out of the connector flange 14 while the other ends of the bolts are free to drop within the confines of a circular retaining cup 51 which is secured to the plate 19 by the bolts 26. Other shear bolts can then be placed in the position of the old bolts 18 and they may be of higher or lower shear strength to vary the shear point, if desired. Also, only one bolt 18 could be used to give one-half the shear value of the assembly shown. The housing 39, and consequently the plate 19, can be easily rotated by hand to align the shear bolt holes in the flange 14 with the holes 21 of the plate 19 to permit easy replacement of the shear bolts.

A specific embodiment of this invention has been shown and described, but it should be apparent that certain changes can be made within the contemplation of the invention, and therefore this invention should be limited only by the scope of the appended claims.

I claim:

1. A combination over-running and torque limiter clutch comprising a rotatable housing, driving and driven clutch elements operatively engagingly disposed within said housing with one of said elements connected to said housing to be rotatable therewith and to permit said driven element to over-run said driving element in the driving direction of rotation, rotatable driving and driven members associated with said housing to respectively connect with said driving and driven clutch elements, means for attaching said housing and one of said members respectively rotatable and axially aligned, said one of said members having a hole offset and parallel to the axis thereof, said housing having a hole alignable with and slightly larger than the first said hole, a shear pin disposed in each two aligned first said hole and second said hole to be engaged between said one of said members and said housing to transmit rotation therebetween with the diameter of said pin being the same as the diameter of the first said hole, a head on said pin for removing the latter from the first said hole, and means within said housing for retaining the housing-engaged end of said shear pin when the latter is sheared and out of the second said hole.

2. In an over-running and torque limiter clutch for assembly with two aligned rotary members with one of said members including an axially transverse circular flange, the combination comprising a rotatable housing, a plate non-rotatably attached to said housing, a ring attached to said housing and having an internal diameter slightly larger than that of said flange to present a transverse circular surface on the exterior face of said plate, driving and driven clutch elements operatively disposed in said housing with one of said elements attached to said housing to rotate therewith and to permit said driven element to over-run said driving element in the driving direction of rotation, a member attached to said housing to overlie said flange when the latter is juxtaposed to said plate and within the confines of said ring for axially and rotatably maintaining said one of said members with respect to said housing, said plate and said flange having alignable holes disposed parallel to the axes thereof with the hole of said plate being threaded, a shear bolt threadedly engaged with each of said holes of said plate and projected into each hole of said flange to rotatably drivingly connect said one of said members to said housing, means for rotatably attaching the other of said members with the other of said clutch elements, a retainer attached to the interior side of said plate to confine the plate-engaged end of said shear pin when the latter is sheared and out of said hole of said plate.

3. In a torque limiting and overrunning clutch the combination of a driven shaft, a housing journaled on said shaft, a ratchet wheel fixed on said shaft within said housing and having peripheral ratchet teeth, a pawl connected in driven relation within said housing and engaged with said ratchet wheel, a driving element juxtaposed with said housing, means securing said driving element in coaxial rotatable relation with said driven shaft and housing, said driving element and said housing presenting juxtaposed relatively slidable surfaces, a threaded bore in said driving element and a bore in said housing substantially coaxial with said threaded bore, a shear pin threaded into said threaded bore and extending into said bore in said housing whereby a portion sheared from said shear pin may find its way into said housing, and a retaining cup in communication with the bore in said housing and providing a wall inwardly of said ratchet teeth and of an extent sufficient to retain fragments of shear pins coming from said bore and to prevent access thereof to said ratchet teeth and said pawl.

4. In a torque limiting and overrunning clutch the combination of a driven shaft, a housing rotatably journaled on said shaft, a ratchet wheel fixed on said shaft within said housing to be non-rotatable with respect to said shaft, a pawl connected in driven relation to said housing to be disposed therewithin and drivingly engaged with said ratchet wheel, a driving element juxtaposed with said housing, means on said housing for securing said driving element in axial relation with respect to said driven shaft and said housing, said driving element having a threaded hole and said housing having a hole aligned with said threaded hole with the alignment thereof offset from said pawl, a shear bolt threaded into said threaded hole and of a length sufficient to have an end of said bolt extend into said hole in said housing for rotatably connecting said driving element and said housing, and a retaining cup disposed in said housing and providing a wall intermediate said pawl and said end of said bolt for retaining said end of said bolt when the latter is sheared.

References Cited in the file of this patent

UNITED STATES PATENTS

| | | |
|---|---|---|
| 842,587 | Skogstad | Jan. 29, 1907 |
| 912,488 | Richards | Feb. 16, 1909 |
| 1,637,944 | Keller | Aug. 2, 1927 |
| 2,267,438 | Briggs | Dec. 23, 1941 |